United States Patent
Hillman et al.

(10) Patent No.: US 7,040,029 B1
(45) Date of Patent: May 9, 2006

(54) METHOD FOR DETECTION OF VEHICLE MOVEMENT DURING WHEEL ALIGNMENT MEASUREMENT

(75) Inventors: Scott Hillman, Granite City, IL (US); David A. Voeller, St. Louis, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 11/001,243

(22) Filed: Dec. 1, 2004

(51) Int. Cl.
*G01B 7/30* (2006.01)
*G01B 11/26* (2006.01)

(52) U.S. Cl. .................. 33/288; 33/203.12; 33/203.14; 33/203.16

(58) Field of Classification Search .............. 33/203.12, 33/203.13, 203.14, 203.15, 203.16, 203.18, 33/203.19, 288; 702/150–153, 94, 95; 356/139.09
See application file for complete search history.

(56) References Cited

U.S. PATENT DOCUMENTS

| | | | | |
|---|---|---|---|---|
| 4,192,074 A | * | 3/1980 | Chang | .......................... 33/228 |
| 4,977,524 A | * | 12/1990 | Strege et al. | ................ 700/279 |
| 5,151,870 A | * | 9/1992 | Beebe et al. | ................. 702/168 |
| 5,165,177 A | * | 11/1992 | Kercheck | .................. 33/203.18 |
| 5,208,646 A | * | 5/1993 | Rogers et al. | .......... 356/139.09 |
| 5,513,439 A | * | 5/1996 | Brauer et al. | ............. 33/203.18 |
| 5,875,418 A | | 2/1999 | Gill et al. | |
| 5,969,246 A | | 10/1999 | Jackson et al. | |
| 6,058,614 A | * | 5/2000 | Shibayama et al. | ............ 33/203 |
| 6,219,134 B1 | * | 4/2001 | Voeller et al. | .......... 356/139.09 |
| 6,237,234 B1 | | 5/2001 | Jackson et al. | |
| 6,323,776 B1 | * | 11/2001 | Jackson et al. | .............. 340/679 |
| 6,374,159 B1 | * | 4/2002 | Naruse et al. | ............... 700/279 |
| 6,512,968 B1 | | 1/2003 | de Bellefeuille et al. | |
| 6,658,749 B1 | | 12/2003 | Jackson et al. | |

OTHER PUBLICATIONS

Hunter Engineering Company—DSP600 Alignment Sensors—For Picture Perfect Alignment -(Pamphlet/8 pages).
Hunter Engineering Company—Hunter 811—Computerized Wheel Alignment System—(Pamphlet/12 pages).

* cited by examiner

*Primary Examiner*—R. Alexander Smith
(74) *Attorney, Agent, or Firm*—Polster, Lieder, Woodruff & Lucchesi, L.C.

(57) ABSTRACT

A method for use with a vehicle wheel alignment system to detect vehicle roll or elevation change during a vehicle wheel alignment procedure requires the steps of observing individual vehicle wheels, and detecting a substantially simultaneous changes in position or rotational movement associated with each observed wheel. Responsive to detected changes, vehicle rolling movement or a vehicle elevation change is identified, enabling the vehicle wheel alignment system and/or operator to respond accordingly.

86 Claims, 6 Drawing Sheets

METHOD FOR DETECTION OF VEHICLE MOVEMENT DURING WHEEL ALIGNMENT MEASUREMENT

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates generally to vehicle wheel alignment systems utilizing optical sensors to acquire measurements of vehicle wheel alignment angles, and in particular, to a vehicle wheel alignment system configured to identify rolling movement of the at least one vehicle wheel during a vehicle wheel alignment procedure, or elevation changes of two or more vehicle wheels, which may adversely affect vehicle wheel alignment angle measurements.

Known vehicle wheel alignment systems utilizing optical sensors, i.e. machine vision, have been in use by the vehicle service industry for several years. A typical machine vision vehicle wheel alignment system, such as the Series 811 wheel alignment system, configured with the DSP600 sensors manufactured by Hunter Engineering Co. of Bridgeton, Mo. consists of a console unit, a set of cameras, and a set of optical targets. The console unit contains at least one central processor, such as a microprocessor, or a suitable set of logic circuits configured with image processing and vehicle wheel alignment software applications, and incorporates various operator interfaces, including a keyboard, a mouse, a printer, and a display device. The cameras are coupled to the computer, and the optical targets are each disposed within the field of view of at least one of the cameras, typically mounted to the wheels of a vehicle undergoing an alignment inspection. In some machine vision wheel alignment systems, optical targets are not used, and the cameras are configured to acquire images of identifiable features on the vehicle wheels, from which alignment angle measurements are determined.

The optical targets or identifiable features on the vehicle wheels are identified in images obtained by the optical sensors, and utilized to determine the position and orientation of the vehicle wheels. The image processing may take place in logic circuits associated with the optical sensors, in an interface computer, or in the console microprocessor. Once the position and orientation of each optical target or identifiable wheel feature is determined, the position and orientation of the associated vehicle wheel is identified, and correspondingly, the various vehicle wheel alignment angle measurements may be either determined or calculated. These angles typically include camber, caster, and toe angles for each vehicle wheel, the vehicle centerline, and the vehicle rear thrust line.

During vehicle wheel alignment procedures, it is often necessary for an operator to "lock" the vehicle brakes to ensure that the wheels of the vehicle do not roll during an alignment angle adjustment or measurement procedure. For example, it is particularly important that the steered wheels of a vehicle be prevented from rolling movement during a live caster angle adjustment procedure which requires a wheel to be adjusted about its Axis of Rotation (AR) to change live caster. It is also important that the steered wheels of a vehicle be prevented from rolling movement during a steering procedure where SAI is being measured and which requires steering the vehicle wheels from one side to another. To prevent the rear wheels from rolling during the steering procedure, the vehicle is typically positioned on a set of slip plates, which are selectively configured to permit a sliding motion of the vehicle in response to forces acting on the vehicle during a turning of the vehicle steered wheels.

Accordingly, it would be advantageous to provide a method for detecting if the vehicle wheels roll during vehicle wheel alignment angle measurements, or if the slip plates upon which the rear wheels are positioned are in a "locked" configuration, preventing required sliding motion of the vehicle during a steering procedure, and to provide an operator with a suitable warning.

Additionally, during vehicle wheel alignment procedures, it is often necessary for the operator to jack or elevate the wheels on an axle or common axis to complete a vehicle wheel alignment measurement procedure or to access alignment angle adjustment components. When an axle or vehicle suspension components are jacked or elevated, such that the vehicle wheels are no longer in contact with a supporting surface, the forces acting on the vehicle suspension system change, and correspondingly, measured vehicle wheel alignment angles change. Measurements of these alignment angles acquired with the vehicle wheels in an unsupported or jacked configuration may not be representative of the actual alignment angles when the vehicle wheel is resting on a supporting surface, and accordingly, should not be utilized in wheel alignment procedures. Furthermore, some vehicle wheel alignment angle measurement procedures cannot be completed with a vehicle wheel in an unsupported or jacked configuration.

Accordingly, it would be advantageous to provide a vehicle wheel alignment system with a method for detecting changes in the elevation of vehicle wheels, so as to enable detection of a wheel jacking procedure or vehicle lift elevation change, and to enable or disable corresponding procedures and measurements in a vehicle wheel alignment software application.

BRIEF SUMMARY OF THE INVENTION

Briefly stated, a preferred method of the present invention for use with a machine-vision vehicle wheel alignment system to detect vehicle wheel roll during a vehicle wheel alignment procedure requires the steps of observing optical targets or identifiable features associated with each individual vehicle wheel, and detecting a simultaneous change in position or rotational movement associated with each observed optical target or identifiable feature. Responsive to a detected simultaneous change, providing a warning to an operator indicative of an occurrence of vehicle wheel rolling movement.

In an alternate method of the present invention for use with a machine-vision vehicle wheel alignment system to detect vehicle wheel roll during a vehicle wheel alignment procedure involving steering of the vehicle wheels, an initial position and orientation of the optical target or identifiable features associated with each individual steered vehicle wheel is observed. The vehicle wheels are steered as required by the vehicle wheel alignment procedure, and returned to the initial position. A second observation of the position and orientation of the optical target or identifiable features associated with each individual steered vehicle wheel is acquired. The initial observations and second observations are compared, and responsive to a change in the position and orientation of the optical target or identifiable features, a warning is provided to an operator indicative of an occurrence of vehicle wheel rolling movement.

In an alternate method of the present invention for use with a machine-vision vehicle wheel alignment system to detect a locked condition of the rear wheel slip plate, an initial observation of the optical targets or identifiable features associated with each individual rear vehicle wheel is carried out. The vehicle front wheels are steered as required by the vehicle wheel alignment procedure, and returned to the initial position. A second observation of the position and orientation of the optical target or identifiable features associated with each individual rear vehicle wheel is acquired. The initial observations and second observations are compared, and responsive to a change in the rotational position of the optical targets or identifiable features, a warning is provided to an operator indicative of the rear wheel slip plates in a locked or fixed configuration, as opposed to an unlocked or "loose" configuration as required for vehicle wheel alignment measurement procedures. Optionally, one or more vehicle wheel alignment angle measurements, such as the live caster adjust measurement, may be automatically compensated for the amount of vehicle movement detected.

An alternate method of the present invention for use with a machine-vision vehicle wheel alignment system observes simultaneous changes in a vertical position of optical targets or identifiable features associated with each wheel on a vehicle axle to detect elevation of the vehicle axle, such as during a jacking procedure.

An alternate method of the present invention for use with a machine-vision vehicle wheel alignment system observes changes in a vertical position of optical targets or identifiable features associated with each wheel on a vehicle axle together with changes in either a camber angle or a toe angle associated with each wheel on the vehicle axle to detect elevation of the vehicle axle, such as during a jacking procedure.

An alternate method of the present invention for use with a machine-vision vehicle wheel alignment system observes changes in a vertical position of optical targets or identifiable features associated with each wheel on a vehicle axle to detect elevation of the vehicle axle, such as during movement of a supporting vehicle lift rack.

In an alternate method of the present invention for use with a machine-vision vehicle wheel alignment system, optical targets or identifiable features associated with each wheel on a vehicle are observed to establish an observed reference plane. The position and orientation of the current reference plane relative to a predetermined point in space or initial reference plane is periodically evaluated by re-observation of the optical targets or identifiable features to identify a change in the vertical position or orientation of the observed reference plane. A change in the vertical position or orientation of the observed reference plane exceeding a predetermined amount is identified with an elevation change in the vehicle's axle, such as during a jacking procedure.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The methods of the present invention are set forth and described herein in the context of machine-vision vehicle wheel alignment systems and vehicle wheel alignment procedures. Those of ordinary skill in the art will recognize that the methods of the present invention are applicable for use with conventional vehicle wheel alignment systems employing sensor units mounted directly to the wheels of a vehicle, such as gyroscopic sensors having sufficient measurement capacity to acquire the required spatial measurements, and may be adapted for use on vehicles having more than four wheels or more than two axles without departing from the scope of the present invention. Hence, the following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
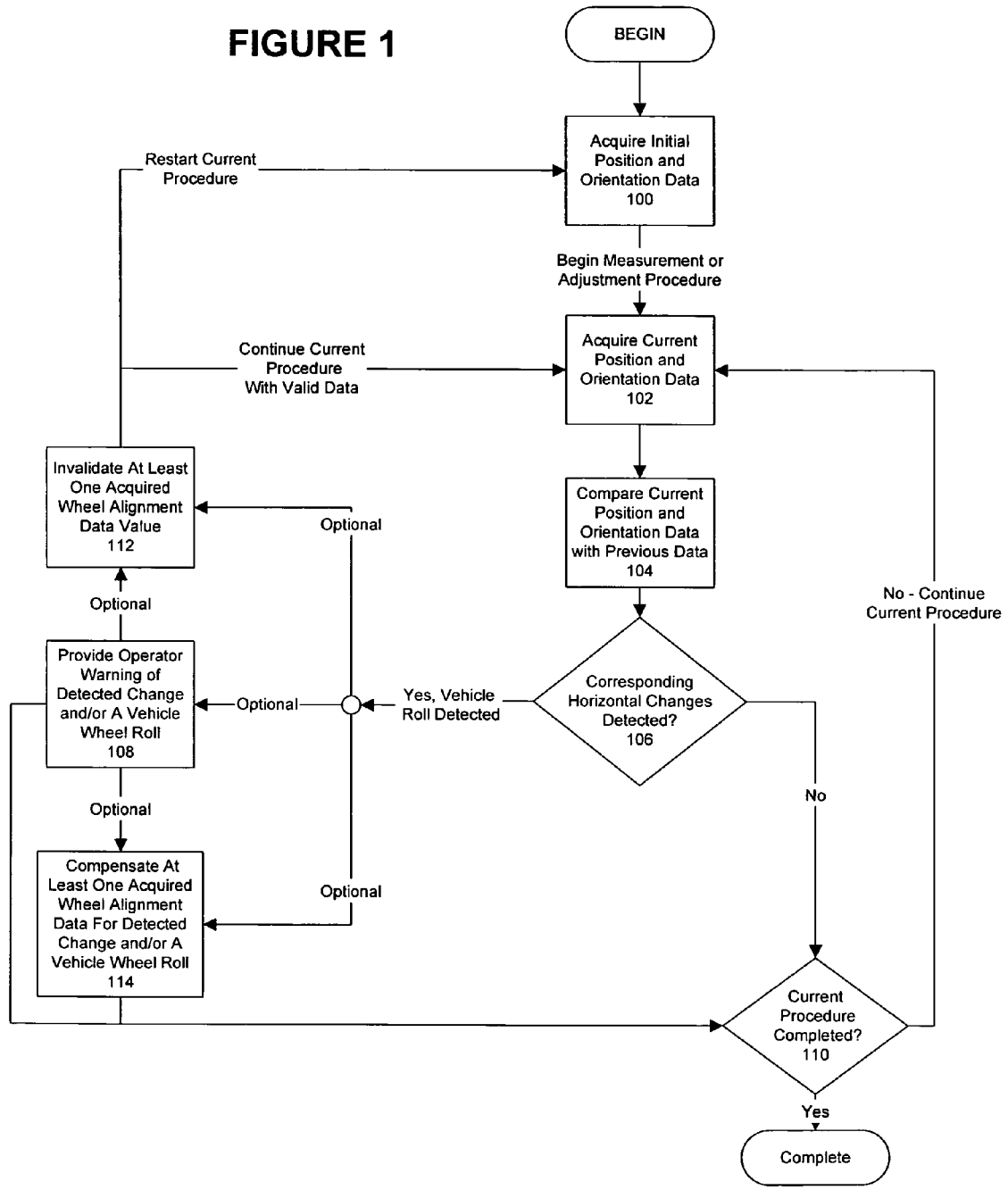
FIG. 1 is a flow chart illustrating the steps of the preferred method of the present invention.

Turning to FIG. 1, the steps of a preferred method of the present invention are shown for use with a machine-vision vehicle wheel alignment system having at least one central processor or other suitable combination of logic circuits configured with a vehicle wheel alignment software application for carrying out a vehicle wheel alignment procedure comprising one or more individual procedures, alignment angle measurements, or alignment angle adjustments. The vehicle wheel alignment system is operatively coupled to suitable sensors means capable of detecting vehicle wheel roll during the vehicle wheel alignment procedure. The method requires the initial step of acquiring an initial set of position and orientation data for each optical target, set of identifiable features, or vehicle wheel, Box 100, after which a measurement or adjustment procedure is begun. The observations to acquire the current position and orientation data for each of the optical targets, sets of identifiable features, or individual vehicle wheel are repeated, Box 102, either in a continuous manner or at discrete intervals, over a period of time during which one or more procedures are carried out.

The current position and orientation data for each vehicle wheel is compared by the central processor against either the associated initial set of position and orientation data or a previously acquired set of associated position and orientation data, Box 104, to detect an occurrence of a substantially simultaneous change in the measurements for at least two vehicle wheels exceeding a predetermined tolerance. A substantially simultaneous change in the horizontal position and orientation data for at least two vehicle wheels is responsive to a rolling movement of the vehicle, Box 106. Upon detection of an occurrence of a substantially simultaneous change in the data for at least two vehicle wheels, one or more events are triggered in the vehicle wheel alignment system. A warning or indication may be provided to the vehicle wheel alignment system operator, Box 108, by the central processor, after which the current procedure is either completed or continued, Box 110, depending upon the point in the alignment procedure at which the vehicle wheel roll was detected.

Optionally, either upon detection of vehicle wheel roll, or following an operator warning, Box 106, at least one vehicle wheel alignment angle measurement acquired during the current procedure is invalidated, Box 112, and the current procedure is restarted, Box 100, or continued utilizing alignment angle measurements which remain valid, Box 102.

Optionally, either upon detection of vehicle wheel roll, or following an operator warning, Box 106, at least one vehicle wheel alignment angle measurement acquired during the current procedure is compensated, Box 114, for determinable changes resulting from the observed movement of the vehicle during the current procedure. Subsequently, the procedure is either completed or continued, Box 110, depending upon the point in the procedure at which the vehicle wheel roll was detected.

Figure 2:
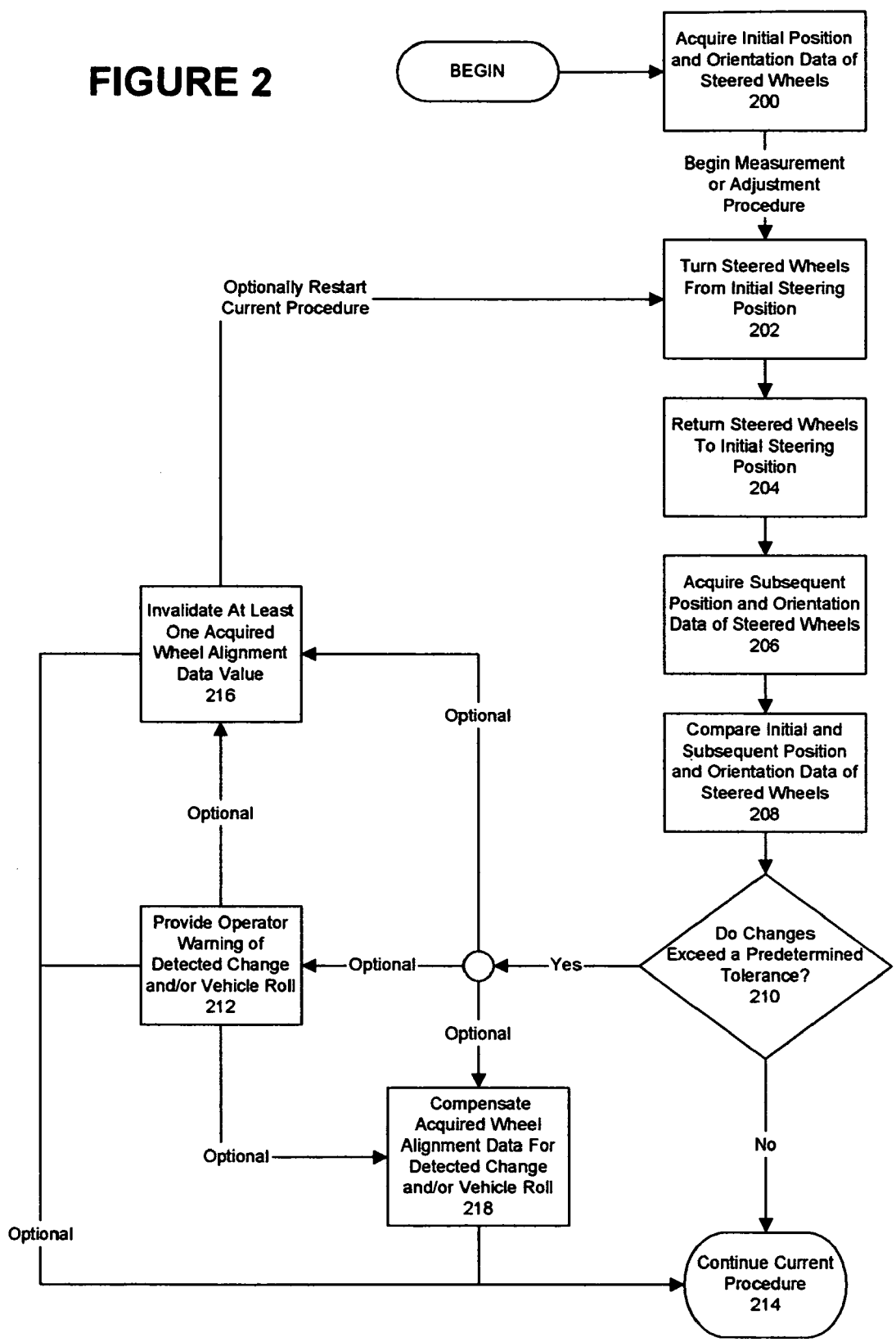
FIG. 2 is a flow chart illustrating the steps of a method of the present invention for detecting rolling movement of vehicle wheels during a wheel steering procedure.

An alternate method of the present invention is illustrated in FIG. 2 for use with a machine-vision vehicle wheel alignment system having at least one central processor or other suitable combination of logic circuits configured with a vehicle wheel alignment software application for carrying out a vehicle wheel alignment procedure comprising one or more individual procedures such as alignment angle measurements or alignment angle adjustments. The central processor is operatively coupled to suitable sensors means to detect vehicle wheel roll during a procedure involving steering of the vehicle wheels. An initial position and orientation for each individual steered vehicle wheel is observed, Box 200. The vehicle wheels are steered as required by the current procedure, Box 202, and returned to the initial position, Box 204. A second observation of the position and orientation of each individual steered vehicle wheel is acquired, Box 206. The initial observations and second observations are compared by the central processor, Box 208, to determine if a change in the position and orientation of the steered vehicle wheels exceeds a predetermined tolerance, Box 210. In the event the amount of change exceeds a predetermined tolerance one or more subsequent events are triggered in the vehicle wheel alignment system.

A warning or indication may be provided to an operator indicative of an occurrence of vehicle wheel rolling movement, Box 212, after which the current procedure is continued, Box 214.

Optionally, either upon detection of an occurrence of a change exceeding the predetermined tolerance in the data for at least one steered vehicle wheel, or following an operator warning, Box 212, at least one vehicle wheel alignment angle measurement acquired during the current procedure is invalidated, Box 216, and the procedure is restarted, Box 202, or continued with the valid wheel alignment angle measurements remaining, Box 214.

Optionally, either upon detection of an occurrence of a change exceeding the predetermined tolerance in the data for at least one steered vehicle wheel, or following an operator warning, Box 212, at least one vehicle wheel alignment angle measurement acquired during the current procedure is compensated, Box 218, for determinable changes resulting from the observed movement of the vehicle during the procedure. For example, if a vehicle wheel is determined to have rolled by 1.0°, caster adjust measurements acquired prior to the detected rolling movement must be compensated by a corresponding amount to remain valid. The current procedure is then continued, Box 214.

Figure 3:
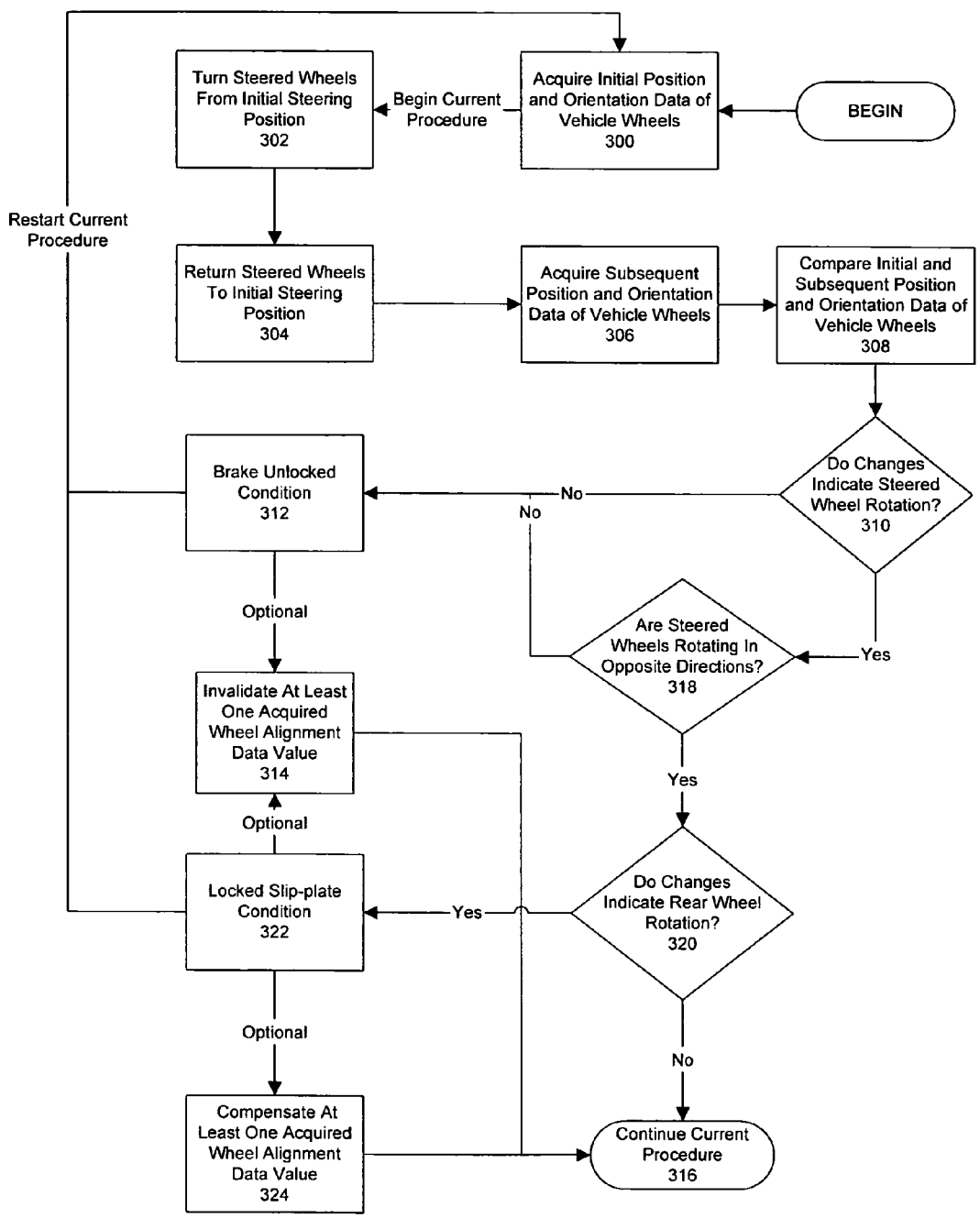
FIG. 3 is a flow chart illustrating the steps of a method of the present invention for detecting a locking condition of a rear wheel slip plate during a vehicle wheel alignment angle measurement procedure.

FIG. 3 illustrates an alternate method of the present invention for use with a machine-vision vehicle wheel alignment system having at least one central processor or other suitable combination of logic circuits configured with a vehicle wheel alignment software application for carrying out a vehicle wheel alignment procedure comprising one or more individual procedures such as alignment angle measurements or alignment angle adjustments which require the vehicle brakes to be in a locked condition and the rear wheel slip plates on which the vehicle rear wheel are disposed to be free to move. The central processor is operatively coupled to suitable sensors means to identify if the vehicle brakes are in a locked or unlocked state and to identify if the slip plates on which the rear wheels of the vehicle are disposed are locked or unlocked state.

Initially, position and orientation data for each vehicle wheel or associated optical target is acquired with the sensors, Box 300. The vehicle front wheels are steered as required by the vehicle wheel alignment procedure, Box 302, and returned to the initial position, Box 304. A second observation of the position and orientation of the optical target or identifiable features associated with each individual vehicle wheel is acquired, Box 306. The initial observations and second observations are compared, Box 308, by the central processor to identify any changes which have occurred between the first and second observations.

A first evaluation of rolling movement of the steered vehicle wheels is made, Box 310, such as by a detected change in the rotational position of the associated optical targets or identifiable features exceeding a predetermined tolerance. If no rolling movement is detected in the steered vehicle wheels between the first and second observations, the vehicle brakes are identified as being in an unlocked condition, Box 312, allowing rotational movement about the wheel axis to offset corresponding rotational movement resulting from suspension geometry during the steering process. With the vehicle brakes identified in an unlocked state, the current procedure is optionally restarted, Box 300, or one or more of the wheel alignment data values acquired during the current procedure are invalidated, Box 314, and the procedure is continued, Box 316.

If the evaluation of rolling movement in the steered vehicle wheels, Box 310, indicates that the steered vehicle wheels have rolled between the first and second observations, the direction of rolling movement for each steered wheel is identified, Box 318. If rolling movement is detected in the same direction for each steered vehicle wheel between the first and second observations, the vehicle brakes are identified as improperly being in an unlocked condition, Box 312, and the current procedure is optionally restarted, Box 300, or one or more of the wheel alignment data values acquired during the current procedure are invalidated, Box 314, and the procedure is continued, Box 316. If rolling movement is detected in opposite directions for each steered vehicle wheel between the first and second observations, the vehicle brakes are identified as properly being in a locked condition, and an evaluation of movement of the rear vehicle wheels is carried out, Box 320.

If the evaluation of movement of the rear vehicle wheels identifies a rotational movement of the rear wheels between the first and second observations, the slip plate on which the rear wheels are disposed is identified as improperly being in a locked state, Box 322. If the slip plates are in a locked state, Box 322, the current procedure is either restarted, Box 300, one or more of the wheel alignment data values acquired during the current procedure are invalidated, Box 314, or one or more of the wheel alignment data values acquired during the current procedure are compensated for determinable effects of the locked slip plate, Box 324, and the procedure is continued, Box 316.

In an alternate embodiment of the present invention, if the evaluation of movement of the rear vehicle wheels identifies no translational movement, i.e., forward/backward or left/right, of the rear wheels between the first and second observations, the slip plate on which the rear wheels are disposed is identified as improperly being in a locked state, Box 322. If the slip plates are in a locked state, Box 322, the current procedure is either restarted, Box 300, one or more of the wheel alignment data values acquired during the current procedure are invalidated, Box 314, or one or more of the wheel alignment data values acquired during the current procedure are compensated for determinable effects of the locked slip plate, Box 324, and the procedure is continued, Box 316.

Those of ordinary skill in the art will recognize that at various points during the procedure, upon a determination of either the vehicle brake system state or the rear wheel slip plate state, a warning or indication may be provided to an operator by the central processor which is indicative of the detected condition, enabling the operator to take appropriate action to correct the condition.

Figure 4:
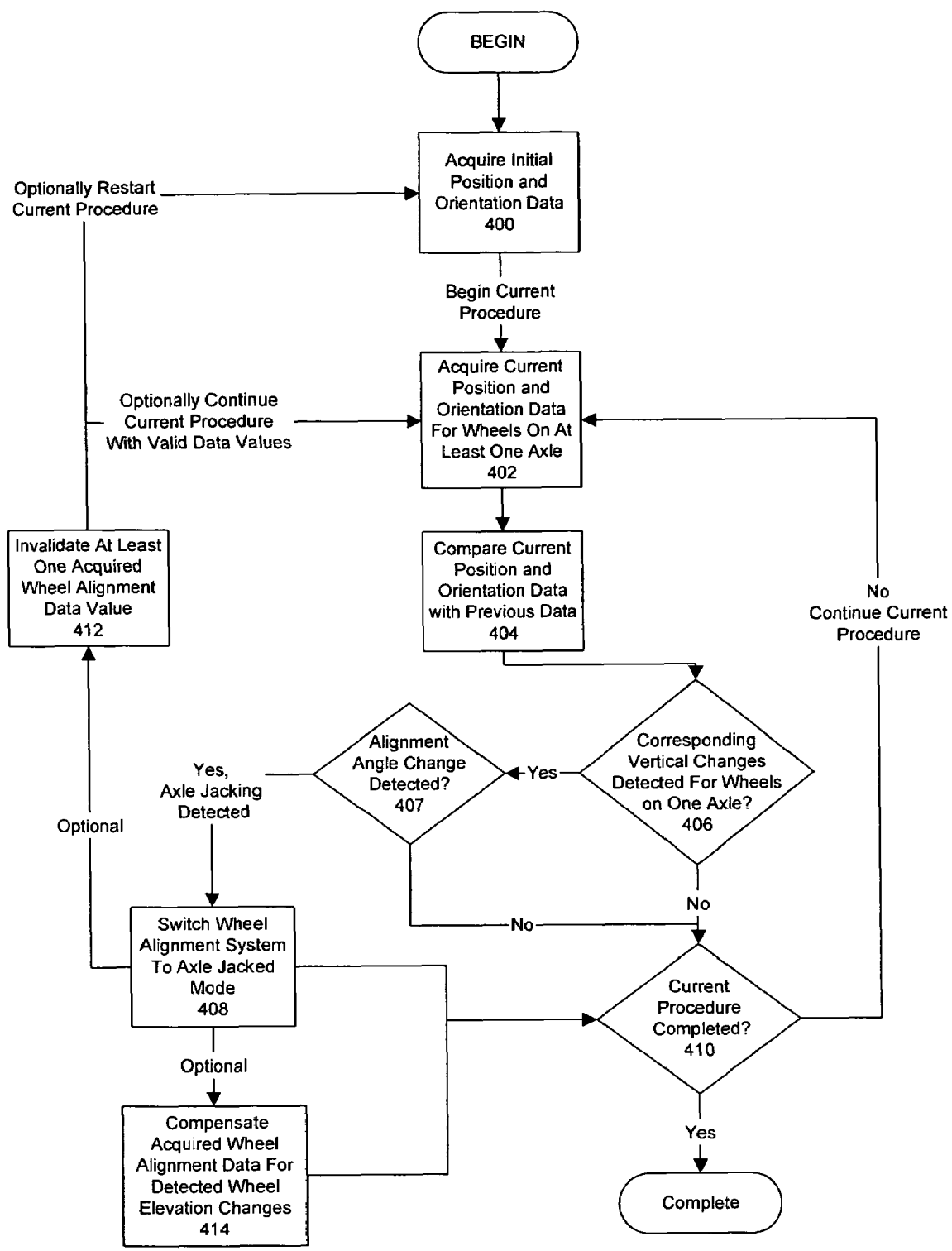
FIG. 4 is a flow chart illustrating the steps of a method of the present invention for detecting elevation changes associated with a vehicle axle.
Figure 5A:
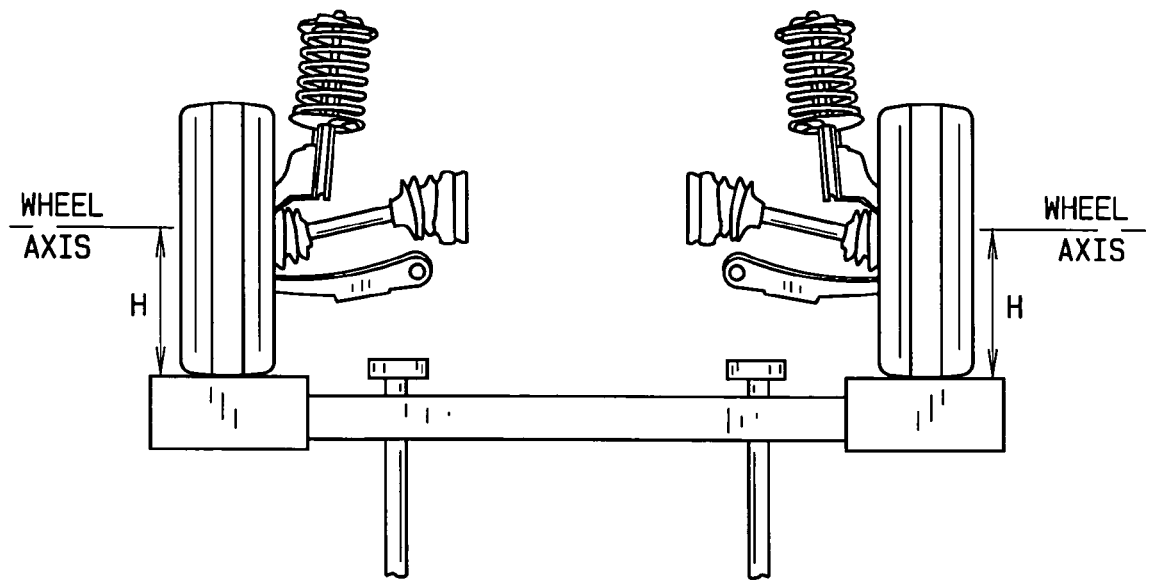
FIG. 5A is a simplified illustration of a set of prior art independent-suspension vehicle wheels having a common transverse axis resting on a support surface.

An alternate method of the present invention is illustrated in FIG. 4 for use with a machine-vision vehicle wheel alignment system having at least one central processor or other suitable combination of logic circuits configured with a vehicle wheel alignment software application for carrying out a vehicle wheel alignment procedure comprising one or more individual procedures such as alignment angle measurements or alignment angle adjustments. The central processor is operatively coupled to suitable sensors means to detect the jacking or elevating of a vehicle axle above a supporting surface during a vehicle wheel alignment procedure. The method requires the initial step of acquiring position and orientation data for each optical target or vehicle wheel in an initial position, such as on a supporting runway and having vertical position H, as shown in FIG. 5A, after which the wheel alignment procedure is begun. The observations to acquire the current position and orientation data for each individual vehicle wheel are repeated, Box 402, either in a continuous manner or at discrete intervals, over a period of time during which one or more vehicle wheel alignment procedures or measurements are carried out by the central processor.

The current position and orientation data for each vehicle wheel is compared by the central processor against either the associated initial set of position and orientation data or a previously acquired set of associated position and orientation data, Box 404, to detect an occurrence of a substantially simultaneous change in the measurements for vehicle wheels at opposite ends of a common axle or common transverse vehicle axis exceeding a predetermined tolerance, Box 406.

Those of ordinary skill in the art will recognize that vehicles having independent suspension systems may not include a common axle for wheels on opposite sides of the vehicle. For example, front wheel drive vehicles may have each front wheel coupled to a transmission via an independent axle shaft. Hence, the vehicle wheels on such vehicles are not considered to have a common axle, but do have a common transverse (left-to-right) axis passing through a center point of each wheel when viewed from directly above or below the vehicle. Accordingly, the term "common axle" as used herein is understood to describe either a physical vehicle axle having wheels disposed on opposite ends, or a common transverse axis about which two vehicle wheels are disposed on opposite sides of a vehicle.

Figure 5B:
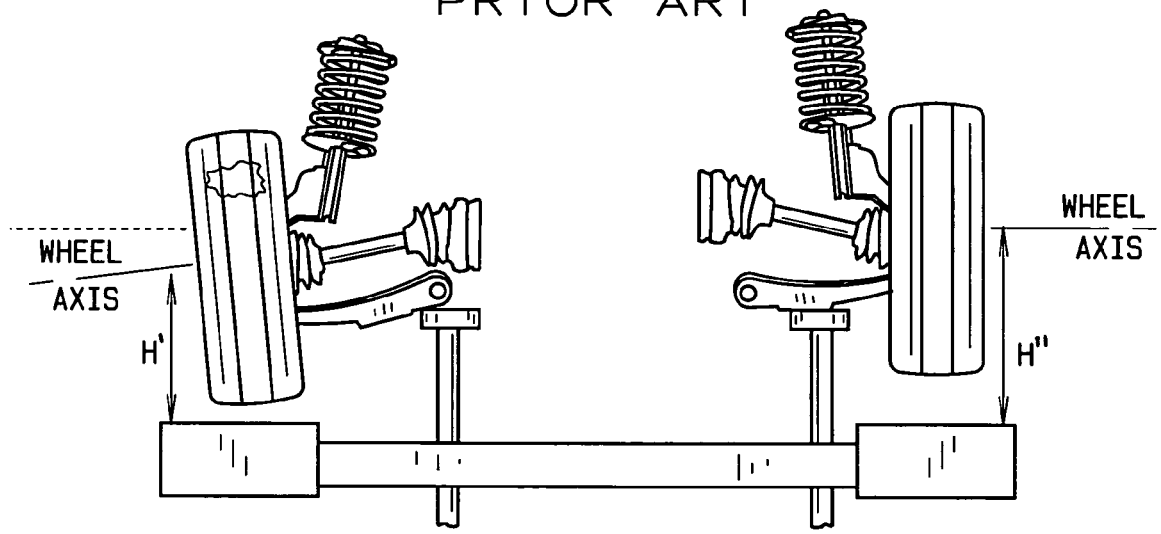
FIG. 5B is a representation of the vehicle wheels of FIG. 5A in a jacked position above the support surface.
Figure 5C:
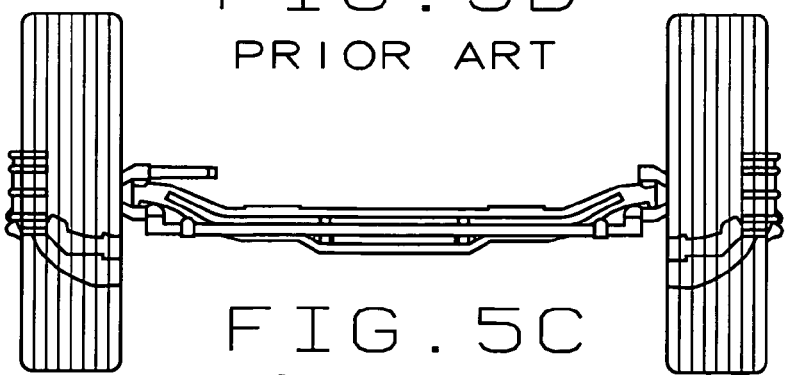
FIG. 5C is a simplified illustration of a set of prior art vehicle wheels having a common axle resting on a support surface.

A substantially simultaneous change in the vertical position of each vehicle wheel on a common axle or common transverse axis is responsive to an elevation change in the axle or axis, such as jacking of the axle or vehicle suspension system. Data representative of one or more wheel alignment angles, such as camber angles, is evaluated by the central processor, Box 407, in addition to changes in the vertical position H to confirm contact or non-contact between the vehicle wheels of the axle or transverse axis and the supporting surface for the vehicle wheels, as shown in FIG. 5B. If the vehicle wheels have not been raised sufficiently to lift them from the supporting surface, the current procedure is continued, Box 410. Those of ordinary skill in the art will recognize that different types of vehicle axles and suspension systems, such as shown in FIGS. 5A, 5B, and 5C will respond differently to jacking procedures, and hence, will have different changes in alignment angles, such as camber, upon the lifting of the vehicle wheels from the supporting surfaces. Additionally, as shown in FIG. 5B, the vertical position H of each wheel on a common axle may change by a different amount during a jacking process, as indicated at H' and H", depending upon the geometry of the vehicle suspension system and the location at which the jacking forces are applied.

Upon detection of an occurrence of a substantially simultaneous change in the data for the vehicle wheels on opposite ends of a common axle or transverse axis, together with detected changes in wheel alignment angles, the vehicle wheel alignment system is switched between an axle-jacked and axle-nonjacked operation mode, Box 408, in which one or more predetermined procedures are made available to the operator, or in which one or more predetermined procedures are temporarily identified as unavailable by the central processor.

At this point, the current procedure is either completed or continued, Box 410, depending upon the point in the procedure at which the axle jacking was detected by the central processor.

Optionally, upon detection of an occurrence of a simultaneous change exceeding the predetermined tolerance in the data for the vehicle wheels on opposite ends of a common axle or transverse axis, one or more of the vehicle wheel alignment angle measurements acquired during the current procedure are invalidated, Box 412, and the current procedure is either restarted, Box 400, or optionally continued with any valid wheel alignment angle measurements remaining, Box 402.

Optionally, upon detection of an occurrence of a simultaneous change exceeding the predetermined tolerance in the data for the vehicle wheels on opposite ends of a common axle or transverse axis, at least one vehicle wheel alignment angle measurement acquired during the current procedure is compensated, Box 414, for determinable changes resulting from the observed movement of the vehicle during the axle jacking process. For example, camber angle measurements associated with the wheels on opposite ends of an axle or axis typically change as the vehicle suspension system is unloaded and elevated above the initial resting surface. The current procedure is then either completed or continued, Box 410, depending upon the point in the procedure at which the vehicle axle-jacking was detected.

Figure 6:
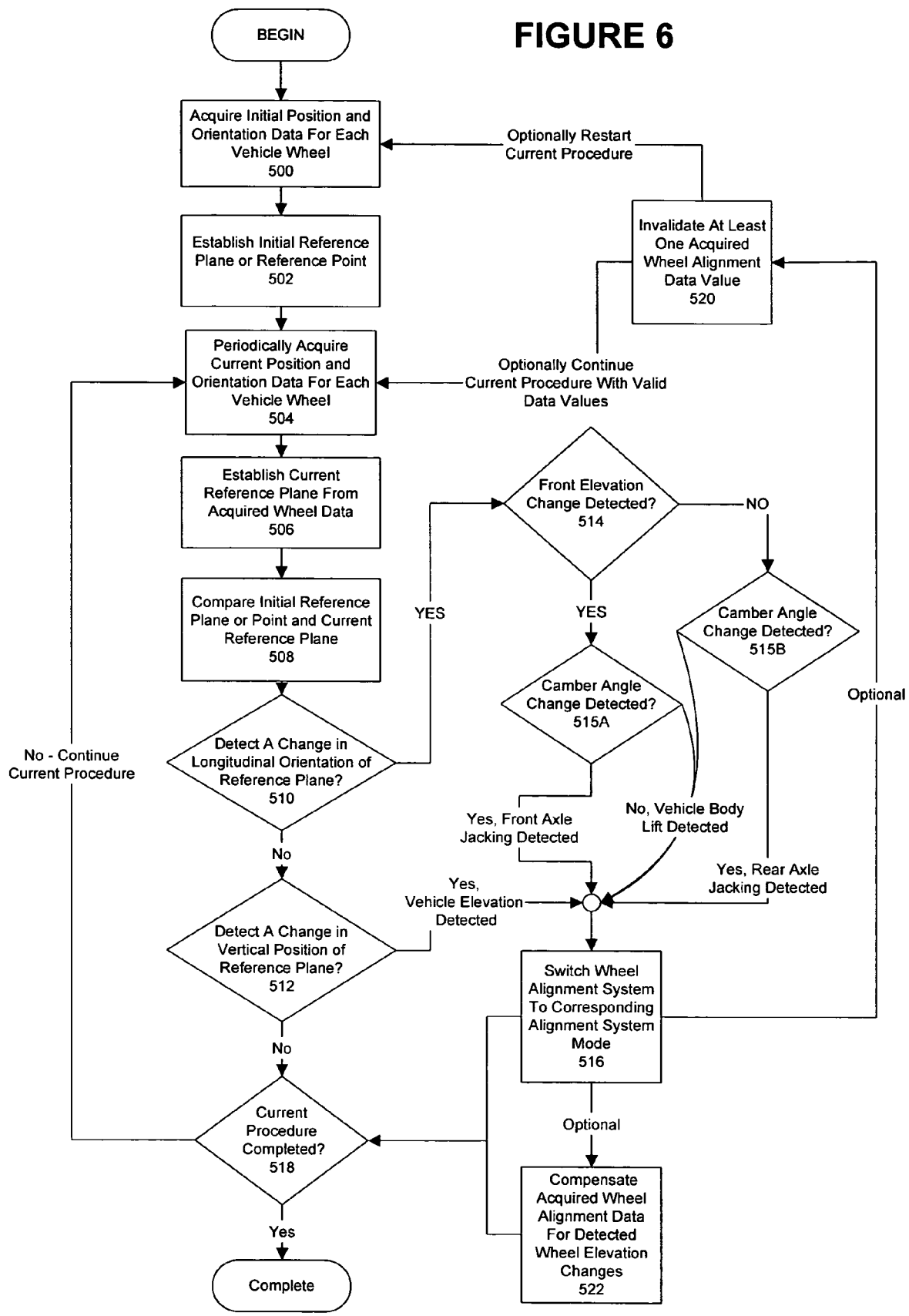
FIG. 6 is a flow chart illustrating the steps of an alternate method of the present invention for detecting elevation changes associated with a vehicle axle.

An alternate method of the present invention is illustrated in FIG. 6 for use with a machine-vision vehicle wheel alignment system having at least one central processor or other suitable combination of logic circuits configured with a vehicle wheel alignment software application for carrying out a vehicle wheel alignment procedure comprising one or more individual procedures such as alignment angle measurements or alignment angle adjustments. The central processor is operatively coupled to suitable sensors means to provide for automatic detection of the jacking or elevating of wheels on an axle or common transverse axis during a vehicle wheel alignment procedure. The method compares a current reference plane established by the central processor from observed wheel position and orientation data, with an initially determined reference plane or reference point in three-dimensional space to detect the jacking or elevation of the wheels on the vehicle axle or transverse common axis.

The method requires the initial step of acquiring an initial set of position and orientation data for each optical target or vehicle wheel, Box 500. The initial set of position and orientation data for each optical target or vehicle wheel is utilized to establish an initial reference plane associated with the current position of each vehicle wheel, Box 502. Alternatively, the initial reference plane may be established from a calibration procedure, or from an observation of optical targets in predetermined or fixed positions, such as on a supporting vehicle rack. Optionally, an initial reference point may be established in three-dimensional space instead of an initial reference plane.

The observations to acquire the current position and orientation data for each of the optical targets, sets of identifiable features, or each individual vehicle wheel are repeated, Box 504, either in a continuous manner or at discrete intervals, over a period of time during which one or more procedures or measurements are carried out. From each set of acquired position and orientation data, a current reference plane associated with the vehicle wheels is identified by the central processor, Box 506. The current reference plane is compared against the initial reference plane or reference point, Box 508, to detect a change in either the longitudinal orientation of the current reference plane, Box 510, or a change in vertical position of the current reference plane, Box 512, from a previously observed orientation or position.

Longitudinal orientation of the current reference plane refers to the inclination (or declination) of the current reference plane along a vehicle's longitudinal centerline, and corresponds to the front-to-rear tilt of the vehicle. When the vehicle is elevated or jacked at a single axle or common transverse axis, the reference plane defined by the locations of the vehicle wheels will elevate at the location of the axle or common axis, i.e. if the vehicle is jacked at the front axle, the reference plane will correspondingly elevate towards the front end of the vehicle. Accordingly, if a change in the longitudinal orientation of the vehicle wheel reference plane is detected by the central processor, Box 510, and the change indicates the front of the vehicle has been elevated, Box 514, a determination that the front axle of the vehicle has been elevated is made. Conversely, if the change in the longitudinal orientation does not indicate that the front of the vehicle has been elevated, a determination that the rear axle of the vehicle has been elevated is made.

Once an axle elevation is detected, the camber wheel alignment angles for each of the vehicle wheels on that axle or axis is monitored to identify a corresponding change indicative of the lifting of the vehicle wheels from a supporting surface, Box 515A, Box 515B, in which case the corresponding axle or axis is identified as being jacked up. If the change in each of the wheel camber angles is not present, or does not exceed a predetermined threshold, then the vehicle wheels are determined to remain on the supporting surface, although the vehicle body may have changed in elevation. Similarly, if the camber angle change for only one wheel on the axle or axis exceeds the predetermined threshold, while the camber angle change for the opposite wheel on the axle or axis does not, a determination that only one wheel has been jacked or elevated above the supporting surface can be made, and appropriate corrective action taken.

If changes are detected in the overall vertical position of the reference plane, Box 512, without a significant change in the longitudinal orientation of the reference plane, Box 510, a determination that the entire vehicle has been elevated, either by raising a support surface on which the vehicle rests, or by simultaneously jacking both vehicle axles or axis, is made by the central processor.

Once a determination is made of the identified change in the vehicle positional configuration, i.e. one or both axles or axis are jacked, the vehicle body elevated, or the vehicle supporting lift elevated, the vehicle wheel alignment system switches to a corresponding operational mode, Box 516, in which one or more predetermined procedures are made available to the operator and/or one or more predetermined procedures are temporarily rendered unavailable to the operator by the central processor. At this point, the current procedure is either completed or continued, Box 518, depending upon the point in the procedure at which the jacking, elevation, or vehicle lift was detected.

Optionally, upon detection of an occurrence of jacking or elevation causing the wheel alignment system to switch to a corresponding operational mode at an improper point in a current procedure, for example, if the operator jacks the wrong axle or axis, or only one wheel is sufficiently elevated, one or more of the vehicle wheel alignment angle measurements acquired during the current procedure are invalidated, Box 520, and the procedure is either restarted, Box 500, or continued with the remaining valid wheel alignment angle measurements, Box 504.

Optionally, upon detection of an axle jacking or vehicle lift action, any vehicle wheel alignment angle measurements acquired during the current procedure are compensated, Box 522, by the central processor for determinable changes resulting from the observed movement of the vehicle during the axle jacking or lift action. For example, camber angle measurements associated with the wheels on opposite ends of an axle or common transverse axis typically change as the vehicle suspension system is unloaded and elevated above the initial resting surface. The current procedure is then either completed or continued, Box 518, depending upon the point in the procedure at which the vehicle wheel roll was detected.

Those of ordinary skill in the art will recognize that while the methods of the present invention have been described in the context of detecting elevation changes in a vehicle due to the jacking of an axle, a common transverse axis, or the raising of a vehicle service lift, the methods are equally applicable to detecting elevation changes in a vehicle due to the lower of a previously jacked axle, common transverse axis, or the lowering of a vehicle service lift. Accordingly, it should be recognized that the present methods are intended for implementation in a vehicle wheel alignment system to recognize any of the various raising and lowering procedures which can be carried out during a vehicle wheel alignment operation, including the raising and lowering of a single vehicle wheel off and on a supporting surface, and to enable suitable wheel alignment system responses to the detected changes.

Those of ordinary skill in the art will recognize that while the alternate methods of the present invention for detecting vehicle rolling movement, slip plate lock conditions, and vehicle jacking and/or lift actions have been described as discrete methods, they may, in fact, be implemented concurrently in a vehicle wheel alignment system to provide either the vehicle wheel alignment system and/or the operator with positional awareness of a vehicle undergoing a wheel alignment procedure.

For example, upon detection of vehicle rolling movement of a rear axle concurrent with the detection of a front axle jacking action, a suitable warning can be provided to a wheel alignment system operator of a potentially unsafe condition associated with the vehicle. If a vehicle undergoing a lifting or jacking action is permitted to roll excessively, i.e., if the parking brake is not applied, it may be possible for the vehicle to roll into an unstable configuration with the lifting or jacking mechanism, potentially harming an operator.

Those of ordinary skill in the art will further recognize that while the alternate methods of the present invention have generally been described in connection with a machine vision vehicle wheel alignment system, they are equally applicable to any vehicle wheel alignment system having alternate suitable sensor means configured to acquire sufficient position and orientation data associated with the vehicle wheel from which the required spatial changes can be identified. Such suitable sensor means may include, for example, line-of-sight optical sensors, or ultrasonic sensors, as well as both conventional and micro-electromechanical gravity-referenced inclinometers, accelerometers, and gyroscopic sensors.

The present invention can be embodied in part in the form of computer-implemented processes and apparatuses for practicing those processes. The present invention can also be embodied in part in the form of computer software applications or program code containing instructions embodied in tangible media, such as floppy diskettes, CD-ROMs, hard drives, or an other computer readable storage medium, wherein, when the computer software applications or program code is loaded into, and executed by, an electronic device such as a central processor, computer, micro-processor or logic circuit, the device becomes an apparatus for practicing the invention.

The present invention can also be embodied in part in the form of computer software applications or program code, for example, whether stored in a storage medium, loaded into and/or executed by a computer, or transmitted over some transmission medium, such as over electrical wiring or cabling, through fiber optics, or via electromagnetic radiation, wherein, when the computer software applications or program code is loaded into and executed by a computer, the computer becomes an apparatus for practicing the invention. When implemented in a general-purpose microprocessor, the computer software applications, modules, or program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for detecting rolling movement of a vehicle undergoing a vehicle wheel alignment procedure, comprising:
   acquiring an initial measurement of a rotational position about a horizontal axis of rotation for at least two vehicle wheels;
   during a current procedure, acquiring at least one subsequent measurement of said rotational position for each of said at least two vehicle wheels;
   comparing each subsequently acquired measurement of said rotational position with a corresponding previously acquired measurement of said rotational position; and
   identifying a change in said rotational position for each of said at least two vehicle wheels corresponding to vehicle wheel rotational movement.

2. The method of claim 1 further including the step of providing an indication of vehicle wheel rotational movement responsive to said identified change exceeding a predetermined tolerance.

3. The method of claim 1 further including the step of completing said current procedure.

4. The method of claim 1 further including the step of compensating at least one wheel alignment angle measurement acquired during said current procedure for said identified vehicle wheel rotational movement.

5. The method of claim 1 wherein said current procedure is restarted responsive to said identified vehicle wheel rotational movement.

6. The method of claim 1 wherein at least one vehicle wheel alignment angle measurement acquired during said vehicle wheel alignment procedure is invalidated responsive to said identified vehicle wheel rotational movement.

7. The method of claim 6 wherein said current procedure is continued with at least one previously acquired valid vehicle wheel alignment angle measurement.

8. The method of claim 1 wherein said current procedure is a vehicle wheel steering procedure.

9. The method of claim 1 wherein said step of identifying a change in said rotational position for each of said at least two vehicle wheels corresponding to vehicle wheel rotational movement is responsive to said comparisons indicating a change in each subsequent measurement of said rotational position for each vehicle wheel from said corresponding previously acquired measurement of said rotational position exceeding a predetermined tolerance.

10. The method of claim 1 wherein each of said measurements of a rotational position for each vehicle wheel are acquired from images of a plurality of identifiable features associated with each vehicle wheel.

11. The method of claim 10 wherein said plurality of identifiable features associated with each vehicle wheel are disposed on optical targets secured to each vehicle wheel.

12. The method of claim 1 wherein said at least two vehicle wheels are transversely disposed on opposite sides of said vehicle.

13. An improved vehicle wheel alignment system having a central processor configured with a vehicle wheel alignment software application for processing data received from a plurality of sensors to facilitate at least one vehicle wheel alignment procedure, the improvement comprising:
 the central processor further configured with a vehicle wheel alignment software application for processing data received from the plurality of sensors to detect rolling movement of a vehicle;
 wherein said vehicle wheel alignment software application is configured to compare at least two acquired measurements of wheel rotational positions for at least two vehicle wheels; and
 wherein said central processor is configured to identify a change in said wheel rotational position for each of said at least two vehicle wheels.

14. The improved vehicle wheel alignment system of claim 13 wherein said vehicle wheels are steered vehicle wheels.

15. The improved vehicle wheel alignment system of claim 13 wherein said central processor is configured to provide an indication of rolling movement of the vehicle to an operator.

16. A method for detecting rolling movement of a vehicle undergoing a steered wheel alignment procedure, comprising:
 acquiring an initial measurement of a rotational position for each steerable vehicle wheel;
 steering said steerable vehicle wheels from an initial steered position;
 returning said steerable vehicle wheel to within a predetermined tolerance of said initial steered position;
 acquiring a second measurement of said rotational position for each steerable vehicle wheel;
 comparing each second measurement of said rotational position for each steerable vehicle wheel with said initial measurement of said rotational position for each steered vehicle wheel; and
 identifying from said comparison, a vehicle steerable wheel rotational movement resulting from said steering movements.

17. The method of claim 16 further including the step of providing an indication of vehicle steerable wheel rotational movement responsive to said identified vehicle steered wheel rotational movement.

18. The method of claim 16 further including the step of completing said steered wheel alignment procedure.

19. The method of claim 16 further including the steps of acquiring at least one wheel alignment angle measurement, and compensating said at least one wheel alignment angle measurement for said identified vehicle steered wheel rotational movement.

20. The method of claim 16 further including the steps of acquiring at least one caster angle measurement, and compensating said at least one caster angle measurement for said identified vehicle steered wheel rotational movement.

21. The method of claim 16 wherein at least one vehicle wheel alignment angle measurement acquired during said vehicle steered wheel alignment procedure is invalidated responsive to said identified vehicle steered wheel rotational movement.

22. The method of claim 21 wherein said steered wheel alignment procedure is restarted responsive to said identified vehicle steered wheel rotational movement.

23. The method of claim 21 wherein said steered wheel alignment procedure is continued with at least one previously acquired valid vehicle wheel alignment angle measurement.

24. The method of claim 16 further including the steps of acquiring at least one wheel alignment angle measurement, and wherein each vehicle wheel alignment angle measurement acquired during said steered wheel alignment procedure is invalidated responsive to said identified vehicle steered wheel rotational movement.

25. The method of claim 16 further including the step of providing an indication of vehicle steered wheel rotational movement responsive to said identified vehicle steered wheel rotational movement exceeding a predetermined tolerance.

26. The method of claim 16 wherein each of said measurements of a rotational position for each steered vehicle wheel are acquired from images of a plurality of identifiable features associated with each steered vehicle wheel.

27. The method of claim 26 wherein said plurality of identifiable features associated with each steered vehicle wheel are disposed on optical targets secured to each steered vehicle wheel.

28. A method for detecting the condition of a vehicle brake system and a set of rear wheel slip plates supporting the rear wheels of a vehicle undergoing a steered wheel alignment procedure, comprising:
 acquiring an initial measurement of a rotational position for each vehicle wheel;
 steering said steered vehicle wheels from an initial steered position;
 returning said steered vehicle wheels to within a predetermined tolerance of said initial steered position;
 acquiring a second measurement of said rotational position for each vehicle wheel;
 comparing each second measurement of said rotational position for each vehicle wheel with said initial measurement of said rotational position for each vehicle wheel;
 responsive to an absence of detected rotational movement in each of said steerable vehicle wheels from said comparison, identifying said vehicle brake system in an unlocked condition;
 responsive to detected rotational movement in each of said steered vehicle wheels from said comparison, identifying a rotational direction associated with each of said steered vehicle wheels, and
  responsive to each of said steered vehicle wheels rotating in the same direction, identifying said vehicle brake system in the unlocked condition;
  responsive to each of said steered vehicle wheels rotating in opposite directions, and responsive to detected rotational movement in each of said rear vehicle wheels from said comparison, identifying at least one of said rear wheel slip plates in a locked condition.

29. The method of claim 28 wherein each of said measurements of a rotational position for each vehicle wheel are acquired from images of a plurality of identifiable features associated with each vehicle wheel.

30. The method of claim 29 wherein said plurality of identifiable features associated with each vehicle wheel are disposed on optical targets secured to each vehicle wheel.

31. A method for detecting a locked/unlocked condition of a vehicle brake system of a vehicle undergoing a steered wheel alignment procedure, comprising:
   acquiring an initial measurement of a rotational position for each steerable vehicle wheel;
   steering said steered vehicle wheels from an initial steered position;
   returning said steered vehicle wheels to within a predetermined tolerance of said initial steered position
   acquiring a second measurement of said rotational position for each steerable vehicle wheel;
   comparing said initial measurements with said second measurements for each steerable vehicle wheel to detect rotational movement; and
   evaluating a direction of rotation for each of said steered wheels to identify a vehicle brake system locked/unlocked condition.

32. The method of claim 31 further including the step of restarting said steered wheel alignment procedure responsive to said identification of said vehicle brake system in an unlocked condition.

33. The method of claim 31 further including the step of invalidating at least one acquired wheel alignment data value responsive to said identification of said vehicle brake system in an unlocked condition.

34. The method of claim 31 further including the step of providing an indication to an operator responsive to said identification of said vehicle brake system in an unlocked condition.

35. A method for detecting a locked/unlocked condition of a set of rear wheel slip plates supporting the rear wheels of a vehicle undergoing an alignment procedure, comprising:
   acquiring an initial measurement of a rotational position for at least each rear vehicle wheel;
   steering said steered vehicle wheels from an initial steered position;
   returning said steered vehicle wheels to within a predetermined tolerance of said initial steered position
   acquiring a second measurement of said rotational position for at least each rear vehicle wheel;
   comparing each second measurement with said initial measurement; and
   responsive to detected rotational movement in each of said rear vehicle wheels from said comparison, identifying at least one of said rear wheel slip plates in a locked condition.

36. The method of claim 35 for detecting the condition a set of rear wheel slip plates wherein said initial measurements and said second measurements are additionally acquired for each of said steered vehicle wheels;
   responsive to detected rotational movement in each of said steered vehicle wheels from said comparison, identifying a rotational direction associated with each of said steered vehicle wheels; and
   wherein said step of identifying at least one of said rear wheel slip plates in a locked condition is further responsive to each of said steered vehicle wheels rotating in an opposite direction.

37. The method of claim 35 further including the step of restarting said steered wheel alignment procedure responsive to said identification of said rear wheel slip plates in a locked condition.

38. The method of claim 35 further including the step of invalidating at least one acquired wheel alignment data value responsive to said identification of said rear wheel slip plates in a locked condition.

39. An improved vehicle wheel alignment system having a central processor configured with a vehicle wheel alignment software application for processing data received from a plurality of sensors to facilitate at least one vehicle wheel alignment procedure, the improvement comprising: the central processor further configured with a vehicle wheel alignment software application for processing data received from the plurality of sensors to detect a condition of a vehicle brake system and a condition of a set of rear wheel slip plates supporting the rear wheels of a vehicle undergoing a steered wheel alignment procedure.

40. An improved vehicle wheel alignment system having a central processor configured with a vehicle wheel alignment software application for processing data received from a plurality of sensors to facilitate at least one vehicle wheel alignment procedure, the improvement comprising:
   said central processor configured to compare at least two acquired measurements of steered wheel rotational positions for each of at least two steered vehicle wheels; and
   wherein said central processor is further configured to respond to a change in said steered wheel rotational positions by evaluating a direction of rotation for each of said steered wheels to identify a vehicle brake system state.

41. An improved vehicle wheel alignment system having a central processor configured with a vehicle wheel alignment software application for processing data received from a plurality of sensors to facilitate at least one vehicle wheel alignment procedure, the improvement comprising: the central processor further configured with a vehicle wheel alignment software application for processing data received from the plurality of sensors to detect a condition of a set of rear wheel slip plates supporting the rear wheels of a vehicle undergoing a steered wheel alignment procedure.

42. The improved vehicle wheel alignment system of claim 41 wherein said central processor is further configured to respond to an evaluation of a direction of rotation for each of said steered wheels identifying each steered wheel rotating in an opposite direction by comparing at least two acquired measurements of rear wheel rotational positions for at least two rear vehicle wheels to identify a rear wheel slip plate condition.

43. A method for detecting an elevation change of a common axle of a vehicle during a vehicle wheel alignment procedure, comprising:
   acquiring an initial set of measurements representative of spatial positions of vehicle wheels on opposite ends of the common axle;
   during a current procedure, acquiring at least one subsequent set of measurement of said spatial positions for said vehicle wheels;
   comparing each subsequently acquired set of measurements with said initial set of measurements of said spatial positions; and
   determining a change in vertical position for each of said vehicle wheels from said comparisons.

44. The method of claim 43 further including the step of providing an indication of an elevation change associated with the common axle responsive to said determined change in vertical position for each of said vehicle wheels.

45. The method of claim 43 further including the step of completing said current procedure.

46. The method of claim 43 further including the step of compensating at least one wheel alignment angle measurement acquired during said current procedure for said determined change in vertical position.

47. The method of claim 43 wherein said current procedure is restarted responsive to said determined change in vertical position.

48. The method of claim 43 wherein at least one vehicle wheel alignment angle measurement acquired during said current procedure is invalidated responsive to said determined change in vertical position.

49. The method of claim 48 wherein said current procedure is continued with at least one previously acquired valid vehicle wheel alignment angle measurement.

50. The method of claim 43 further including the step of evaluating at least one alignment angle measurement responsive to said determined change in vertical position.

51. The method of claim 50 further including the step of providing an indication of an elevation change associated with the common axle responsive to said evaluation of said at least one alignment angle identifying a change in said at least one alignment angle exceeding a predetermined tolerance.

52. The method of claim 43 wherein said determined change in vertical position is associated with an axle jacking action.

53. The method of claim 52 further including the step of presenting an operator with at least one additional procedure responsive to said axle jacking action.

54. The method of claim 43 wherein each of said measurements of a spatial position for each vehicle wheel are acquired from images of a plurality of identifiable features associated with each vehicle wheel.

55. The method of claim 54 wherein said plurality of identifiable features associated with each vehicle wheel are disposed on optical targets secured to each vehicle wheel.

56. An improved vehicle wheel alignment system having a central processor configured with a vehicle wheel alignment software application for processing data received from a plurality of sensors to facilitate at least one vehicle wheel alignment procedure, the improvement comprising: the central processor further configured with a vehicle wheel alignment software application for processing data received from the plurality of sensors to detect an elevation change of at least one common axle of a vehicle during a vehicle wheel alignment procedure.

57. The improved vehicle wheel alignment system of claim 56 wherein said vehicle wheel alignment software application is configured to compare at least two acquired measurements of wheel spatial positions for at least two vehicle wheels; and
  wherein said central processor is configured to respond to said comparisons identifying a corresponding change in elevation for each of said at least two vehicle wheels by providing an elevation indication associated with said an common axle of said at least two vehicle wheels.

58. The improved vehicle wheel alignment system of claim 56 wherein said elevation change of at least one common axle of a vehicle is responsive to a jacking procedure for said at least one common axle.

59. The improved vehicle wheel alignment system of claim 56 wherein said central processor is further configured with a vehicle wheel alignment software application for processing data received from the plurality of sensors to detect an elevation change of a vehicle during a measurement procedure.

60. The improved vehicle wheel alignment system of claim 56 wherein the central processor is further configured with a vehicle wheel alignment software application for processing data received from the plurality of sensors to detect an elevation change of each common axle of a vehicle during a measurement procedure; and
  wherein said elevation change of each common axle is responsive to a vehicle lift movement.

61. A method for detecting elevation changes associated with a vehicle having a set of vehicle wheels during a vehicle wheel alignment procedure, comprising:
  establishing an initial reference plane associated with the initial spatial positions of the vehicle wheels;
  subsequently determining at least one current reference plane associated with the current spatial positions of the vehicle wheels during a current procedure;
  comparing said current reference plane with said initial reference plane to detect a change in longitudinal orientation of said current reference plane from said initial reference plane; and
  identifying an elevation change associated with a common axle of the vehicle.

62. The method of claim 61 wherein at least one of said reference planes is established relative to a point in three-dimensional space.

63. The method of claim 61 for detecting elevation changes associated with a vehicle wherein said comparing step further includes detecting an elevation change associated with a front axle of the vehicle; and
  wherein said identifying step includes identifying an elevation change associated with said front axle.

64. The method of claim 61 for detecting elevation changes associated with a vehicle wherein said comparing step further includes detecting an elevation change associated with a rear axle of the vehicle; and
  wherein said identifying step includes identifying an elevation change associated with said rear axle.

65. The method of claim 61 further including the step of completing the current procedure.

66. The method of claim 61 further including the step of compensating at least one wheel alignment angle measurement acquired during the current procedure for said detected elevation change.

67. The method of claim 61 wherein said current procedure is restarted responsive to said identified elevation change.

68. The method of claim 61 wherein each vehicle wheel alignment angle measurement acquired during said current procedure is invalidated responsive to said identification of an elevation change.

69. The method of claim 68 wherein said current procedure is continued with at least one previously acquired valid vehicle wheel alignment angle measurement.

70. The method of claim 61 wherein said elevation change is associated with an axle jacking action.

71. The method of claim 70 further including the step of presenting an operator with at least one additional procedure responsive to said axle jacking action.

72. The method of claim 61 wherein each of said spatial positions of the vehicle wheel are acquired from images of a plurality of identifiable features associated with each vehicle wheel.

73. The method of claim 72 wherein said plurality of identifiable features associated with each vehicle wheel are disposed on optical targets secured to each vehicle wheel.

74. The method of claim 61 for detecting elevation changes associated with a vehicle having a set of vehicle wheels during a vehicle wheel alignment procedure further including the step of detecting rolling movement of the vehicle; and responsive to detected rolling movement exceeding a predetermined tolerance concurrent with a detected change in said longitudinal orientation of said current reference plane from said initial reference plane, providing an indication of vehicle rolling movement.

75. The method of claim 61 for detecting elevation changes associated with a vehicle having a set of vehicle wheels during a vehicle wheel alignment procedure further including the step of detecting rolling movement of the vehicle; and responsive to detected rolling movement exceeding a predetermined tolerance concurrent with a detected change in elevation of said current reference plane from said initial reference plane, providing an indication of vehicle rolling movement.

76. The method of claim 61 wherein said comparing step further includes comparing said current reference plane with a predetermined point in said initial reference plane to detect a change in longitudinal orientation of said current reference plane from said initial reference plane.

77. The method of claim 61 wherein said comparing step further includes comparing said current reference plane with a predetermined point in said initial reference plane to detect a change in elevation of said current reference plane from said initial reference plane.

78. A method for detecting elevation chances associated with a vehicle having a set of vehicle wheels during a vehicle wheel alignment procedure, comprising:

establishing an initial reference plane associated with the initial spatial positions of the vehicle wheels;

subsequently determining at least one current reference plane associated with the current spatial positions of the vehicle wheels during a current procedure;

comparing said current reference plane with said initial reference plane to detect a change in longitudinal orientation of said current reference plane from said initial reference plane;

identifying an elevation chance associated with a common axle of the vehicle;

comparing said current reference plane with said initial reference plane to detect a substantially uniform elevation change between said current reference plane and said initial reference plane; and responsive to a detected substantially uniform elevation change between said current reference plane from said initial reference plane, identifying the elevation change associated with the vehicle.

79. The method of claim 78 wherein said elevation change is associated with a change in a vehicle lift position.

80. The method of claim 78 further including the step of presenting an operator with at least one procedure associated with a current vehicle lift position.

81. An improved vehicle wheel alignment system having a central processor configured with a vehicle wheel alignment software application for processing data received from a plurality of sensors to facilitate at least one vehicle wheel alignment procedure, the improvement comprising: the central processor further configured with a vehicle wheel alignment software application for processing data received from the plurality of sensors to detect rolling movement of a vehicle concurrent with an elevation change of at least one common axle of said vehicle during said vehicle wheel alignment procedure.

82. A method for detecting a locked/unlocked condition of a set of rear wheel slip plates supporting the rear wheels of a vehicle undergoing an alignment procedure, comprising:

acquiring an initial measurement of a position for at least each rear vehicle wheel;

steering said steered vehicle wheels from an initial steered position;

returning said steered vehicle wheels to within a predetermined tolerance of said initial steered position acquiring a second measurement of said position for at least each rear vehicle wheel;

comparing each second measurement with said initial measurement; and responsive to an absence of detected translational movement in each of said rear vehicle wheels from said comparison, identifying at least one of said rear wheel slip plates in a locked condition.

83. The method of claim 82 for detecting the condition a set of rear wheel slip plates wherein said initial measurements and said second measurements are additionally acquired for each of said steered vehicle wheels;

responsive to detected rotational movement in each of said steered vehicle wheels from said comparison, identifying a rotational direction associated with each of said steered vehicle wheels; and wherein said step of identifying at least one of said rear wheel slip plates in a locked condition is further responsive to each of said steered vehicle wheels rotating in an opposite direction.

84. The method of claim 82 further including the step of restarting said steered wheel alignment procedure responsive to said identification of said rear wheel slip plates in a locked condition.

85. The method of claim 82 further including the step of invalidating at least one acquired wheel alignment data value responsive to said identification of said rear wheel slip plates in a locked condition.

86. A method for detecting a locked/unlocked condition of a set of rear wheel slip plates supporting the rear wheels of a vehicle undergoing an alignment procedure, comprising:

acquiring an initial measurement of a position for at least each rear vehicle wheel;

steering said steered vehicle wheels from an initial steered position;

returning said steered vehicle wheels to within a predetermined tolerance of said initial steered position acquiring a second measurement of said position for at least each rear vehicle wheel;

comparing each second measurement with said initial measurement; and responsive to an absence of detected translational movement in each of said rear vehicle wheels from said comparison, providing an indication to an operator.

* * * * *